Nov. 18, 1969  T. E. MacKENZIE ET AL  3,479,587

REFLECTION-COEFFICIENT MEASURING APPARATUS

Filed June 14, 1967

INVENTORS
THOMAS E. MacKENZIE
DONALD B. SINCLAIR

BY  *Rines and Rines*

ATTORNEYS

United States Patent Office 3,479,587
Patented Nov. 18, 1969

3,479,587
REFLECTION-COEFFICIENT MEASURING
APPARATUS
Thomas E. MacKenzie, West Acton, and Donald B. Sinclair, Concord, Mass., assignors to General Radio Company, Concord, Mass., a corporation of Massachusetts
Filed June 14, 1967, Ser. No. 646,102
Int. Cl. G01r 27/04
U.S. Cl. 324—58                                17 Claims

ABSTRACT OF THE DISCLOSURE

The problem of variation with frequency in the calibration factor of reflection-coefficient measurements, and related disadvantages in combined balun and multi-port power-divider network reflection-coefficient measuring apparatus are largely obviated by employing a novel lumped-circuit resistor chain network in substitution for the power divider network.

The present invention relates to reflection-coefficient measuring apparatus, being more specifically directed to such apparatus employing combined balun and multi-port power-divider networks.

In such apparatus, the power-divider network has comprised a plurality of T or delta resistor networks interconnecting, with matched coaxial transmission lines, the out-of-phase balanced alternating-current voltage output terminals of the balun, with ports respectively terminated in standard and unknown impedances, and a further port to which a matched detector is connected. The detector measures directly the complex reflection coefficient of the unknown impedance. At high frequencies, in view of the presence of effective lengths of transmission-line sections involved in the connections of the resistor networks of the power-divider network junction, deleterious phase shifts have been found to be introduced that result in different effects if added than if subtracted in the circuit operation. This results in a variation with frequency in the calibration factor or proportionality constant (later-described in terms of the constant K) of the reflection-coefficient measurement. While this frequency-dependent variation could be reduced by introducing attenuation pads in the connections between the networks, this would undesirably correspondingly reduce the output signal.

An object of the present invention, accordingly, is to provide a new and improved reflection-coefficient measuring apparatus of this character that overcomes in large measure these frequency-dependent variations and related problems without reducing the available signal. This is effected, in summary, by substantially eliminating the effective transmission-line connections between the power divider networks and providing in place of the power-divider networks a novel lumped-circuit multi-port resistance chain.

A further object is to provide an improved radio-frequency impedance-measuring apparatus of more general utility.

Other objects are hereinafter discussed and are more specifically delineated in the appended claims.

Figure 1:
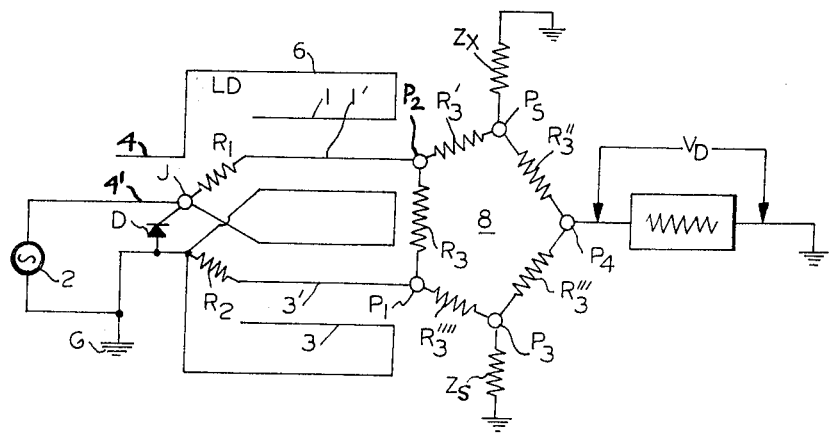
Figure 2:
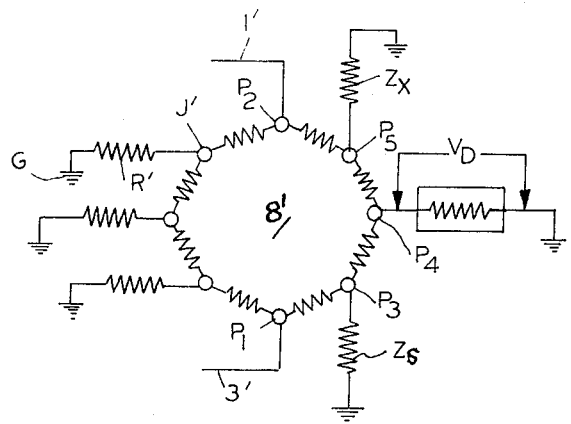
Figure 3:
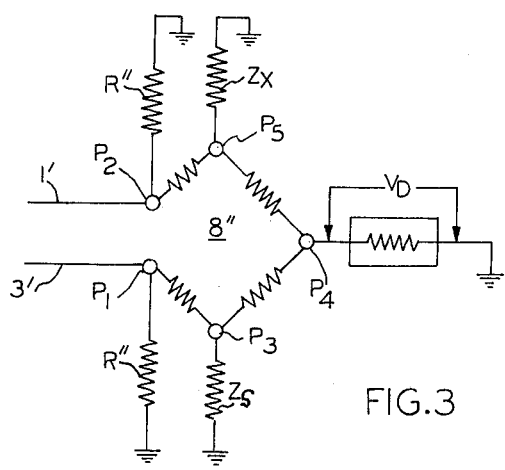

The invention will now be described with reference to the accompanying drawing, FIG. 1 of which is a schematic circuit diagram of a preferred embodiment; and FIGS. 2 and 3 are partial circuit diagrams of modified lumped circuit networks for use in the bridge system of FIG. 1.

Referring to FIG. 1, an unbalanced generator or source of alternating-current voltage is shown at 2 feeding a balun illustrated as a pair of similar coaxial-line members 1–1', 3–3', the outer conductors of which are short-circuited to an external cavity structure 6, and the inner conductors 1' and 3' of which are respectively fed through series resistances $R_1$ and $R_2$ from a common-source coaxial line 4'–4. The inner line 4' of the common-source line connects at junction J to resistor $R_1$, and the outer line 4 (grounded at G) connects through resistance $R_2$ to the inner line 3' of the coaxial-line member 3—3'; the resistances $R_1$ and $R_2$ preferably having a value corresponding to the characteristic impedance of the coaxial-line members 1–1' and 3–3' and that of a hereinafter-described characteristic network impedance $Z_0$, such as 50 ohms. A control diode D is shown connected between the junction J and the outer conductor 4 of the common line to monitor the voltage at J so that it may be kept constant with frequency and with variation in the reflection coefficient of the later-described unknown impedance termination $Z_x$ with respect to the later-described standard terminating impedance $Z_s$.

In accordance with the present invention, there is connected to the balun output terminals $P_1$ and $P_2$ a lumped-circuit resistor chain network 8, the successive resistor elements of which are positioned as closely as possible to one another and provide at least five ports $P_1$, $P_2$, $P_3$, $P_4$ and $P_5$ at successive resistor junctions. The five resistors $R_3$, $R_3'$, $R_3''$, $R_3'''$ and $R_3''''$ of FIG. 1, for example, may comprise nichrome film resistors deposited in a lumped, small-dimension chain upon an insulating wafer as of ceramic (generally designated at 8). In actual practice, in order to enable such a small resistive chain to dissipate substantial power, it has been found preferable to deposit the film on a berrylia wafer which has a very high thermal conductivity. The deposited resistors may be less than a tenth of an inch long and less than a sixteenth of an inch in width; and the wafer may be less than a sixteenth of an inch thick.

In this instance, the chain forms a closed five-sided polygon, substantially eliminating effective transmission-line length between successive resistor connections and providing two ports $P_1$ and $P_2$ for receiving the out-of-phase, equal-magnitude source voltages from the balun 6–1–1'–3–3'; a third port $P_3$ connected to ground through the standard terminating impedance $Z_s$; a fifth port $P_5$ connected to ground through the unknown impedance $Z_x$; and a foutrh port $P_4$, to which the matched detector, represented at $V_D$, is connected. It has been determined that the resistors $R_3 \ldots R_3''''$ may be of equal value substantially $$\left(\frac{\sqrt{13}-1}{2}\right)$$

times the characteristic network impedance $Z_0$, for example, to achieve the ends that (1) substantially zero signal occurs at the detector port $P_4$ when the impedance of the unkown impedance $Z_x$ equals $Z_s$, (2) substantially zero reflection occurs looking back into the fifth port $P_5$ when all other ports are effectively terminated in the characteristic network impedance $Z_0$, and (3) a relatively low insertion loss is provided between the source and detector with $P_5$ open-circuited. Under such conditions, if $Z_s = Z_0$, the bridge output or "error" signal measured by the detector $V_D$ at port $P_5$ is directly proportional to the complex reflection coefficient $\Gamma_x$ of the unknown termination $Z_x$ (relative to $Z_s$) and to the effective source voltage $V_g$ at the junction J; i.e., $$\Gamma_x = \frac{1}{K}\frac{V_D}{V_g}$$

where K is the before-mentioned calibration factor or proportionality constant which may be a complex quantity, just as are the other parameters $V_D$, $V_g$ and $\Gamma_x$. If $V_g$ is maintained constant, $\Gamma_x$ is then directly proportional to $V_D$.

An eight-sided closed polygonic resistor chain lumped-circuit network is shown at $8'$ in FIG. 2, it being understood that more than eight resistors may, of course, also be employed. Outside (shown to the left) of the five port junctions $P_1$–$P_5$, each of the additional resistor junctions (such as $J'$) is shown connected to ground G by a further resistor (such as $R'$). It has been determined that, for the above results, the resistors of the chain may each have a value of $(aZ_0)$, where $a$ is the positive real root of the expression $a^4+6a^3+6a^2-12a-12=0$, $a$ being approximately equal to 1.332 . . . , which is about four-thirds. Each of the further resistors $R'$ is then preferably of value substantially equal to $Z_0$.

To illustrate the efficacy of the invention, as compared with the power-T-divider junctions before mentioned, the maximum variation in the magnitude of the calibration constant K has been determined to be somewhat less than half the value occurring wtih the power-T-divider for substantially the same output signal amplitude at $V_D$. Specifically, for an output signal amplitude $V_D$ of about 0.047 (measured with no phase shift between ports $P_3$ and $P_5$), the maximum variation in the amplitude of K, when actual phase shifts exist, is about twenty-five percent for the power-T-divider network, as compared with about twelve percent for the lumped chain network of FIG. 2.

In the embodiment of FIG. 3, the lumped-circuit chain $8''$ is open, with ports $P_1$ and $P_2$ being grounded through resistors $R''$, preferably of value $2\ Z_0$. Results comparable to those of the eight-resistor lumped chain of FIG. 2 are attainable with the modified grounded configuration of FIG. 3.

The input impedance of the balun-cavity 6, which is a short-circuited transmission line, varies with frequency. However, to minimize the loading upon the source 2 as a result of this variation, and, in particular, to avoid the possibility of presenting a short-circuit load to the diode D when the length of line is a multiple of a half-wavelength of the frequency of the source 2, lossy dielectric may be used for damping, as indicated at LD, to fill or partially fill the cavity; and magnetic loading in the cavity (such as ferrites) may also be employed at LD for the same reason and, additionally, to increase the impedance at low frequencies and thus extend the low-frequency limit of operation.

What is claimed is:

1. Reflection-coefficient-measuring apparatus having, in combination, a substantially constant source of alternating-current voltage providing balanced out-of-phase outputs at a pair of terminals and at a predetermined impedance, a lumped resistance-chain circuit network provided with five ports at successive points along the chain, means for connecting said terminals to two of the ports, means for connecting a terminating impedance to a third port, means for connecting a detector matched to said predetermined impedance to a fourth port, means for enabling the connecting of an unknown impedance the complex reflection coefficient of which is to be measured relative to the said terminating impedance to the fifth port, the resistance elements of the chain being proportioned such that the detector indicates substantially zero signal when the impedance of the unknown impedance equals said terminating impedance, substantially zero reflection occurs looking into said fifth port when all other ports are effectively terminated in said predetermined impedance, and a relatively low insertion loss is provided between the said source and detector with the said fifth port open-circuited.

2. Apparatus as claimed in claim 1 and in which the said terminating impedance is substantially equal to the said predetermined impedance, whereby the detector output is directly proportional to said complex reflection coefficient.

3. Apparatus as claimed in claim 1 and in which said chain comprises a polygon of resistance elements.

4. Apparatus as claimed in claim 3 and in which the polygonic chain of resistance elements is closed upon itself.

5. Apparatus as claimed in claim 4 and in which the chain is five-sided with each of the five resistance elements of value substantially $$\left(\frac{\sqrt{13}-1}{2}\right)$$

times the said predetermined impedance.

6. Apparatus as claimed in claim 4 and in which the polygonic chain contains more than five resistance elements, the junctions of successive resistance elements outside said five ports being provided with further grounded resistance elements.

7. Apparatus as claimed in claim 6 and in which the chain resistance elements are of value substantially four-thirds the said predetermined impedance and the further resistance elements are of value substantially equal to said predetermine impedance.

8. Apparatus as claimed in claim 7 and in which said value is "a" times the said predetermined impedance, where $a$ is the positive real root of the expression $a^4+6a^3+6a^2-12a-12=0$.

9. Apparatus as claimed in claim 3 and in which the said two ports are connected with further grounded resistance elements.

10. Apparatus as claimed in claim 9 and in which the chain and the said further resistance elements are respectively of value substantially four-thirds and twice said predetermined impedance.

11. Apparatus as claimed in claim 1 and in which said resistance chain comprises a film resistor lumped-circuit network deposited upon an insulating wafer.

12. Apparatus as claimed in claim 11 and in which said wafer is of berrylia.

13. Apparatus as claimed in claim 1 and in which the said source comprises a balun connected to an alternating-current generator, the said apparatus being adjusted to prevent the balun from effectively shunting any of the third, fourth and fifth ports.

14. Apparatus as claimed in claim 13 and in which said balun comprises a pair of coaxial-line members the inner conductors of which are connected at one end through a corresponding pair of series resistances of said predetermined impedance to a common coaxial-line member fed from said generator, and at the other end to said pair of terminals.

15. Apparatus as claimed in claim 14 and in which said series resistances are interconnected by control diode means.

16. Apparatus as claimed in claim 14 and in which said balun-coaxial-line members comprise short-circuited transmission-line sections disposed within a cavity structure.

17. Apparatus as claimed in claim 16 and in which said cavity structure is filled with at least one of lossy dielectric material and magnetic material such as ferrites.

References Cited

UNITED STATES PATENTS

| | | |
|---|---|---|
| 2,521,522 | 9/1950 | Keitley. |
| 2,666,132 | 1/1954 | Barrow. |
| 2,702,366 | 2/1955 | Ginzton. |
| 3,278,840 | 10/1966 | Wilson _____ 324—57 |

P. F. WILLE, Primary Examiner

RUDOLPH V. ROLINEC, Assistant Examiner